United States Patent
Schuman et al.

(10) Patent No.: US 12,473,482 B2
(45) Date of Patent: Nov. 18, 2025

(54) NONTOXIC HIGH TEMPERATURE RESISTANT HYDROGELS

(71) Applicant: The Curators of the University of Missouri, Columbia, MO (US)

(72) Inventors: Thomas P. Schuman, Rolla, MO (US); Baojun Bai, Rolla, MO (US); Buddhabhushan Pundlik Salunkhe, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 18/251,852

(22) PCT Filed: Sep. 20, 2021

(86) PCT No.: PCT/US2021/047487
§ 371 (c)(1),
(2) Date: May 4, 2023

(87) PCT Pub. No.: WO2022/098412
PCT Pub. Date: May 12, 2022

(65) Prior Publication Data
US 2023/0407163 A1  Dec. 21, 2023

Related U.S. Application Data

(60) Provisional application No. 63/109,746, filed on Nov. 4, 2020.

(51) Int. Cl.
*C09K 8/42* (2006.01)

(52) U.S. Cl.
CPC .................. *C09K 8/426* (2013.01)

(58) Field of Classification Search
None
See application file for complete search history.

(56) References Cited

U.S. PATENT DOCUMENTS

| | | | |
|---|---|---|---|
| 8,669,214 B2 | 3/2014 | Moradi-Araghi et al. | |
| 10,889,745 B1 | 1/2021 | Jin et al. | |
| 11,162,016 B2 | 11/2021 | Pu et al. | |
| 11,453,814 B2* | 9/2022 | Bai | C09K 8/508 |
| 11,549,048 B2* | 1/2023 | Pu | C09K 8/5045 |
| 2013/0005616 A1 | 1/2013 | Gaillard et al. | |
| 2014/0144628 A1* | 5/2014 | Moradi-Araghi | E21B 33/138 166/275 |
| 2019/0011955 A1 | 1/2019 | Stewart et al. | |
| 2019/0119559 A1 | 4/2019 | O'Toole et al. | |
| 2020/0325384 A1* | 10/2020 | Pu | C09K 8/512 |

FOREIGN PATENT DOCUMENTS

| | | |
|---|---|---|
| CN | 104449613 | 3/2015 |
| CN | 108676119 | 10/2018 |
| CN | 110903816 | 7/2020 |
| JP | 2008220786 | 9/2008 |
| WO | 2010105070 A1 | 9/2010 |

OTHER PUBLICATIONS

International Search Report and Written Opinion in related PCT Application No. PCT/US2021/047487, mailed Sep. 20, 2021, 12 pages.
European Search Report dated Sep. 2, 2024 in corresponding EP218897791, 8 pages.
Machine Translation of CN108676119, 6 pages. Date: Oct. 19, 2018.
Machine Translation of CN104449613, 6 pages. Date: Mar. 25, 2015.
Machine Translation of JP2008220786, 8 pages. Date: Sep. 25, 2008.

* cited by examiner

*Primary Examiner* — John J Figueroa
(74) *Attorney, Agent, or Firm* — HOVEY WILLIAMS LLP

(57) ABSTRACT

Compositions of swellable non-toxic hydrogels and their use in conformance control are described herein. More specifically, the present invention generally relates to the hydrogels compositions that can be used to treat the oil reservoirs having high temperature and high salinity conditions. The compositions generally comprise a plurality of swellable particles having one or more crosslinkers interspersed within a polymer matrix. The compositions can also be used in biomedical, agricultural, fracking and similar applications wherein thermally-stable, nontoxic hydrogels are required.

36 Claims, 1 Drawing Sheet

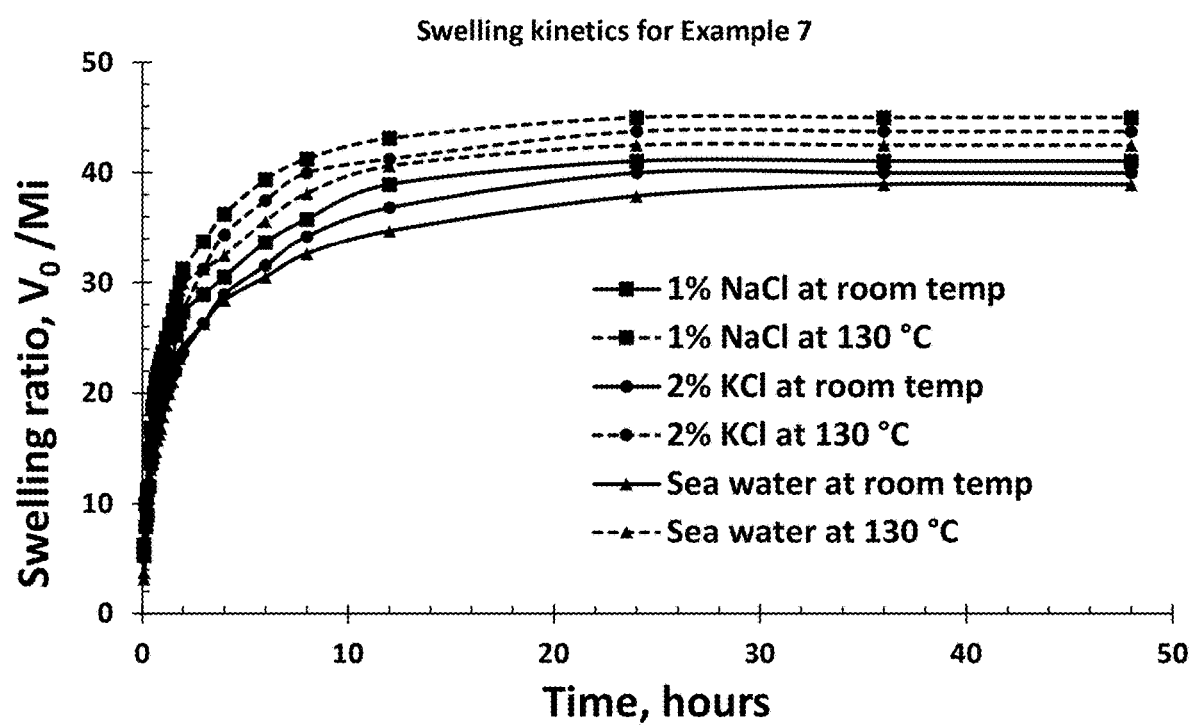

NONTOXIC HIGH TEMPERATURE RESISTANT HYDROGELS

BACKGROUND OF THE INVENTION

Field of the Invention

The present invention is generally directed to compositions of thermally stable nontoxic hydrogels. More particularly, the present invention relates to thermally stable hydrogels and preformed particle hydrogels (PPGs) that can be used to plug petroleum formations, or control reservoir fluid flow conformance, at unusually high temperatures of up to 150° C. or higher. These PPGs can be used for conformance control, fluid loss control, and well stimulation.

Description of Related Art

Excess water production is a major concern for most of the oilfields around the world. This excess water production significantly increases the treatment costs of produced water from oilfields, causes corrosion and scale, and increases environmental concerns, which leads the production of wells to become economically challenging and results in shutting down of some of these wells. Controlling excess water production has become a major objective for the oil industry for several decades. Using polymer gels to plug off the water thief zones in reservoirs, including massive void space conduits, fractures, and channels, has been proven to be a cost-effective method to deal with this problem. By plugging these thief zones, injection water can be forced to go through less permeable and oil-rich regions, thereby improving the oil recovery and reducing displacing fluid circulation through wells. The plugging of these regions can be done by two kinds of polymer gels: in-situ crosslinking gels and preformed gels. In-situ crosslinking gels show some drawbacks in plugging these thief zones, such as lack of control over the gelation time, gelling uncertainty due to shear degradation, chromatographic fractionation, and dilution. On the other hand, preformed gels are synthesized in aboveground facilities and therefore help to overcome some of the drawbacks with in-situ gel treatments. Preformed particle gels are dried, cross-linked polymer gel package which, on contact with water, have ability to swell up to a hundred times of the original size.

Oil reservoirs in the North Sea are at high temperature (up to 150° C.) and pressure conditions with salinity range of 40,000-80,000 ppm total dissolved solids. These reservoirs impose stringent environmental regulations towards the use of chemicals to treat the wells. To meet these conditions, gel treatment requires hydrogels with no aquatic toxicity and higher durability. The hydrogels should additionally exhibit long-term thermal stability.

Conventional hydrogels used for enhanced oil recovery (EOR) are based on polymers such as polyacrylamides and polyacrylates. These polymers are hydrolytically unstable at higher temperatures over 105° C. and undergo rapid molecular structure degradation. These conventional hydrogels are prone to hydrolysis under high temperature conditions, which limit their use in higher temperature oil reservoirs. Thus, there is a significant need of non-toxic hydrogels with improved thermal stability to treat these higher temperature oil reservoirs.

SUMMARY OF THE INVENTION

To overcome the drawbacks of current preformed particle gels, embodiments of the present invention are directed to compositions of swellable non-toxic hydrogels and their use in conformance control. More specifically, the present invention generally relates to the hydrogels compositions that can be used to treat the oil reservoirs with higher temperature of greater than 130° C., greater than 140° C., and up to 150° C. and high salinity environment (e.g., 40,000 mg/L). Additionally, these compositions can be used in biomedical, agricultural, fracking and similar applications wherein such robust, nontoxic hydrogels are required.

In one embodiment, there is provided a composition useful for controlling fluid flow. The composition comprises a plurality of swellable particles. The particles comprise one or more crosslinkers interspersed among crosslinkable polymer chains. The one or more crosslinkers are capable of forming covalent bonds between the polymer chains. Upon swelling, the particles exhibit less than about 50 percent decrease in volume after being exposed to a temperature of at least about 130° C. for at least about 1 hour.

In another embodiment, there is provided a method of forming a composition useful for controlling fluid flow. The method comprises: (a) polymerizing a plurality of monomers in the presence of one or more crosslinkers so as to form crosslinkable polymer chains; and (b) drying and reducing the average particle size of the product resulting from (a) to yield a plurality of swellable particles comprising the one or more crosslinkers interspersed among said crosslinkable polymer chains. The one or more crosslinkers are capable of forming covalent bonds with the polymer chains. Upon swelling, the particles exhibit less than about 50 percent decrease in volume after being exposed to a temperature of at least about 130° C. for at least about 1 hour.

In another embodiment, there is provided a method of altering or controlling a fluid present in an environment. The method comprises introducing a composition into the environment so that the composition contacts the fluid. The composition comprises a plurality of swellable particles comprising one or more crosslinking agents interspersed among crosslinkable polymer chains. The one or more crosslinkers are capable of forming covalent bonds with the polymer chains. Upon swelling, the particles exhibit less than about 50 percent decrease in volume after being exposed to a temperature of at least about 130° C. for at least about 1 hour.

BRIEF DESCRIPTION OF THE DRAWINGS

FIG. 1 is a graph depicting swelling kinetics of the high temperature resistant preformed particle gels in 1% NaCl, 2% KCl and Sea water.

DETAILED DESCRIPTION

The present invention generally relates to compositions of nontoxic, robust hydrogels comprising swellable particles. Additionally, the present invention generally relates to the use of such compositions in processes related to enhanced oil recovery (e.g., conformance control and fluid loss control) so as to improve hydrocarbon recovery, for example by improving sweep efficiency. Furthermore, in some embodiments, the compositions are suitable for use as a conformance control agent, wherein particles are dispersible in water and brines of variable ionic strengths. In various embodiments, the hydrogel compositions disclosed herein may be referred to as high temperature resistant PPGs (HT-PPG). The thermal stability can generally be evidenced by the particles retaining their swollen volumes and/or the bulk gel retaining its mechanical properties (e.g., retaining at least more than 50% of its elastic modulus) when exposed to high temperatures over long periods of time, even in various aqueous and brine solutions (e.g., 2% KCl and sea water). Advantageously, in some embodiments, upon swelling, the particles exhibit less than about 50 percent, less than about 60 percent, less than about 70 percent, less than about 80 percent, less than about 90 percent, less than about 95 percent, less than about 99 percent decrease in volume after being exposed to a temperature of greater than about 130° C., greater than about 140° C., or up to about 150° C. for at least about 1 hour, at least about 2 hours, at least about 5 hours, at least about 12 hours, at least about 1 day, at least about 10 days, at least about 30 days, at least about 6 months, at least about 1 year, at least about 2 years, at least about 3 years, or at least about 5 years. Moreover, the HT-PPG compositions are advantageously nontoxic to aquatic environments.

The HT-PPG compositions described herein are useful as plugging agents and can be pumped into injection wells or boreholes at oilfields using brine or formation water as a carrier fluid. These preformed HT-PPG can be transported into a target zone. In certain embodiments, the target zone is selected from the group consisting of fractures, conduits, lost-circulation zones, cavernous formations, high-permeability zones, wellbores, and perforations. The target zone may generally have a temperature of at least 50° C., 85° C., 100° C., 110° C., 120° C., or 130° C., and/or less than 200° C., 190° C., 180° C., 170° C., or 160° C. In certain embodiments, the carrier fluid is selected from the group consisting of fresh water, produced water, sea water, brine, drilling fluid, and servicing fluid. In some embodiments, the carrier fluid has a salinity of about 1,000 to about 60,000 mg/L of TDS. In one or more embodiments, the HT-PPG composition is dispersed into the carrier fluid at a weight ratio of about 1:1 to about 1:50, preferably 1:5 to about 1:20 dry HT-PPG to carrier fluid.

Advantageously, the swollen HT-PPG is thermally stable in the target zone and resists or will not undergo degradation under high temperature and high salinity conditions. Thus, the HT-PPG compositions described herein overcome the drawbacks of conventional PPG, particularly deficiencies of degradation and mechanical vulnerability, which provides a superior alternative for conformance control problem for reservoirs with high temperature and high salinity.

Generally, the hydrogel compositions according to embodiments of the present invention comprise a plurality of swellable particles. The particle compositions generally comprise combinations of monomers, polymers, crosslinkers, and/or additives, wherein these components may be homogeneously distributed in the compositions when the polymer chains are synthesized and form a polymer matrix. As used herein, the "polymer matrix" refers to a polymer network formed via free radical polymerization in solution wherein the polymer chains were connected via crosslinking, which takes place simultaneously with the growth of polymer chains. In some embodiments, the swellable particles generally comprise one or more one or more crosslinkers, preferably covalent crosslinkers, interspersed among the crosslinkable polymer chains of the polymer matrix.

The polymer matrix of the particles may comprise a variety of polymers, and the polymer chains may be synthesized from a variety of monomers. However, in some preferred embodiments, the monomers and/or polymers are selected so as to be nontoxic and/or provide enhanced thermal stability properties. In certain embodiments, the particle polymer matrix comprises one or more crosslinkable polymer chains. In some embodiments, the one or more crosslinkable polymer chains comprise one or more non-ionic monomers and/or one or more anionic monomers. In some preferred embodiments, the polymer matrix comprises polymer chains comprising both one or more nonionic monomers and one or more anionic monomers. In some such embodiments, the one or more crosslinkable polymer chains comprise one or more nonionic monomers and one or more anionic monomers at a weight ratio of about 1:1 to about 100:1, preferably about 3:1 to about 50:1, and more preferably about 5:1 to about 20:1 (nonionic monomers-to-anionic monomers). In some embodiments, the one or more nonionic monomers comprise N,N'-dimethylacrylamide. In some embodiments, the one or more anionic monomers is selected from the group consisting of sodium 4-vinylbenzenesulfonate, 2-acrylamido-2-methylpropane sulfonic acid, and combinations thereof. Advantageously, these anionic monomers possess a sulfonate functionality as a pendant group that is stable to hydrolytic cleavage at elevated temperature. Furthermore, these anionic monomers provide a system with a slight negative charge when used as a copolymer which aid in achieving better hydrolytic stability. Although particularly preferred monomers are described herein, it is within the scope of the present invention that other monomers and/or polymers may be used to form the polymer matrix, particularly monomers and/or polymers that are nontoxic and demonstrate high thermal stability.

The one or more crosslinkers are generally interspersed within the polymer matrix and are capable of forming covalent bonds between the polymer chains. In some embodiments, the one or more crosslinkers comprises a covalent crosslinker selected from the group consisting of divinylbenzene, methylene bisacrylamide, trimethylolpropanetriacrylate, and combinations thereof. In some preferred embodiments, the covalent crosslinker comprises divinylbenzene, which is particularly hydrolytically stable compared to other crosslinkers. In some preferred embodiments, divinylbenzene is the only crosslinker present, and thus the composition is substantially free of methylene bisacrylamide, trimethylolpropanetriacrylate, and/or other crosslinkers.

The amount of the various monomers, polymers, and/or crosslinkers may be selected based on the particular application and thermal stability requirements. In some embodiments, the weight ratio of crosslinkable polymer chains to one or more crosslinkers is from about 100:1 to about 10,000:1, about 200:1 to about 5000:1, about 500:1 to about 2000:1.

In certain embodiments, the polymer matrix comprises 0.5 weight percent to 100 weight percent, about 50 to about 98 weight percent, about 75 to about 95 weight percent, or about 85 to about 93 weight percent of nonionic monomer based on the total monomer content of the polymer chains. In some embodiments, the polymer matrix comprises about 0.5 to about 100 weight percent, about 1 to about 75 weight percent, or about 2 to about 50 weight percent of anionic monomers based on the total monomer content of the polymer chains. In some embodiments, the polymer matrix comprises about 1 to about 25 weight percent, about 2 to about 15 weight percent, or about 8 to about 12 weight percent of 4-vinylbenzenesulfonate on total monomer content of the polymer chains. In some embodiments, the polymer matrix comprises about 1 to about 25 weight percent, about 3 to about 15 weight percent, or about 5 to about 10 weight percent of 2-acrylamido-2-methylpropane sulfonic acid on total monomer content of the polymer chains.

In certain embodiments, the composition generally comprises about 0.01 to about 0.7 weight percent, about 0.02 to about 0.15 weight percent, about 0.05 to about 0.12 weight percent, or about 0.09 to about 0.11 weight percent of the covalent crosslinker based on the total monomers present in the composition.

One or more polymerization initiators will also be present during the synthesis (polymerization) process. The initiators are typically selected based on the monomers being utilized and the polymerization process selected, but typical initiators include those selected from the group consisting of persulfate initiators, azo initiators, redox initiators, and combinations thereof. In some embodiments, the one or more initiators are selected from the group consisting of persulfates (e.g., ammonium persulfate, potassium persulfate), N,N,N',N'-tetramethylethylenediamine, sodium bisulfite, acyl peroxide, hydrogen peroxide, dialkyl peroxides, ester peroxide, ketone peroxide, azo compounds (e.g., 2'-azobis [2-methyl-N-(2-hydroxyethyl) propionamide, 2,2'-azobis (2-methylpropionamidine) dihydrochloride), and combinations thereof. In some preferred embodiments, N,N,N',N'-tetramethylethylenediamine and/or sodium bisulfite are used, which help in lowering the activation energy of the radical production at reasonable rates over a wide range un temperatures. Additionally, in some embodiments, water (e.g., deionized water) is used as a solvent during polymerization and to prepare stock solutions of initiators and redox initiators.

Furthermore, the amount of initiator utilized will typically be from about 0.01 to about 4 weight percent, preferably from about 0.02 to about 2 weight percent, and more preferably from about 0.5 to about 1 weight percent, based upon the total weight of the monomers used in synthesis taken as 100% by weight.

A polymerization accelerator can optionally be present during the synthesis process. Typical accelerators include those selected from the group consisting of sodium thiosulfate (STS), sodium bisulfite (SBS), sodium metabisulfite (SMS), thiomalic acid, nitrilotriacetic acid, glycerol, ascorbic acid, and mixtures thereof. Furthermore, the amount of accelerator utilized will typically be from about 0.01 to about 0.2% by weight, preferably from about 0.02 to about 0.1% by weight, and more preferably from about 0.02 to about 0.05% by weight, based upon the weight of all ingredients utilized taken as 100% by weight.

Additives can be mixed into the system before the synthesis stage, preferably those additives are ones that coordinate/associate with the formed polymer (e.g., to form hydrogen bond/Van der Waals associations). Other additives can interpenetrate the polymer chains, while others can simply be mixed into the system without reaction with other components. For instance, the nanometer or micrometer size particles can be pre-treated by surfactant or a surface coating material before mixing into reservoir fluid.

Exemplary optional ingredients or additives include those selected from the group consisting of tackifiers, plasticizers, crosslinking agents, polymers other than the crosslinkable polymer, aromatic compounds, deoxidants, adjustors of gelant (e.g., $NH_4Cl$, NaOH, carbamide), nanoclay, initiators, stabilizers (e.g., clays (e.g., montmorillonite, bentonite), tetramethylethylenediamine, resorcinol, organic complexing agents, $NaN_3$), celluloses, epoxy resins, silica, silicon oxide, aluminum oxide, carbon nanotubes, graphene, micro-fiber or nylon particles, ethylenediaminetetraacetic acid (EDTA), and mixtures thereof.

Embodiments of the present invention are also directed to methods and compositions for synthesizing hydrogels, particularly swellable PPG and HT-PPG. Generally, the synthesis comprises 1) polymerization of one or more monomers and covalent crosslinkers to form a covalent polymer matrix; 2) drying of the polymer matrix to obtain a dried polymer matrix, 3) pulverizing the dried polymer matrix into small particles to form the swellable particle compositions. In some embodiments, the methods for synthesizing the HT-PPG comprise free radical polymerization. In one or more embodiments, polymerization occurs at temperature of 25, 30, 35, 40, 45, 50, 55 or 60° C. Furthermore, in various embodiments, the polymerization may occur for at least 6, 8, 10, 12, 18, 24, 48 hours. The synthesis of the HT-PPG is conducted using one or more monomers, polymers, covalent crosslinkers, initiators, redox initiators, and/or deionized water, as described above.

The resulting particles (after grinding/pulverizing) generally have an average particle size of about 10 nm to about 10 mm. In various embodiments, the HT-PPG may comprise an average particle size of at least 0.1, 0.2, 0.3, 0.4, or 0.5 mm and/or less than 10, 5, 4, 3, 2, 1, or 0.9 mm. In various embodiments, the HT-PPG may comprise an average particle size of 0.1 to 100 μm or as small as 10 nm, which can be obtained through grinding, ball milling, or colloidal milling.

Upon exposure to water, brine (e.g., aqueous NaCl, $CaCl_2$), or $AlCl_3$), or other fluids, the particle compositions begin to swell. It is preferred that swelling commence within about 0.1 seconds to about 300 seconds, and preferably within about 0.1 seconds to about 10 seconds of contact with the fluid. In various embodiments, the HT-PPG compositions are in the form of particles having an initial average particle size prior to contacting the fluid and a second average particle size after contacting the fluid and swelling. In such embodiments, the second average particle size can be at least about 5, 10, 15, 20, 25, 30, 35, or 40 times greater than that of the initial average particle size. It is preferred that these swelling ranges be reached within a time period of from about 60 minutes to about 240 hours, preferably from about 60 minutes to about 300 minutes, and preferably from about 120 minutes to about 180 minutes of contact with the target fluid.

The HT-PPG compositions described herein may exhibit desirable shear modulus characteristics. In various embodiments, swollen HT-PPG may exhibit a shear modulus of at least 85, 100, 150, 200, 250, 300, 400, 500, 600, 700, 800, 900 Pa after being aged for 1 day, 2 days, 10 days, and 30 days. Moreover, in one or more embodiments, the swollen HT-PPG compositions exhibit a shear modulus of at least 100, 200, 300, 350 Pa after being aged for 3, 4, 5 and 6 months of aging at 150° C. Additionally, in one or more embodiments, the HT-PPG compositions exhibit a shear modulus of at least 100, 200, 300, 350 Pa after being aged for 3, 4, 5, and 6 months of aging in brine of variable ionic strength, e.g. 2% KCl and sea water.

Furthermore, HT-PPG may also exhibit desirable swelling properties. In various embodiments, HT-PPG may exhibit a swelling ratio of at least 10, 15, 20, 25, 30, 35, 40, 45 percent after a time period of 0.5, 1, 2, 3, 4, 6, 8, 12, 18, 24, 36 and 48 hours at 23° C. or 130° C. in an aqueous solution comprising of 1% NaCl, 2% KCl or sea water containing monovalent and divalent ions. The swelling ratio refers to the fractional increase in the volume of the particulate gel due to brine absorption.

In various embodiments, HT-PPG exhibit a storage modulus of at least 100, 200, 300, 400, 500, 600, 700, 800 or 900 Pa when measured at a frequency of 1 Hz and stress of 1 Pa at 23° C.

Additionally, in one or more embodiments, the thermal stability of the compositions is exhibited at temperatures of 80° C., 120° C. and 150° C. (and temperatures in between these values). The thermal stability of the particle compositions may be measured using Thermogravimetric analysis (TGA) in their pristine form over various aging (or exposure) time periods. Mark-Houwink $[\eta]=K\,M^a$ equation may be used to assess the viscosity change on aging.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth embodiments in accordance with the invention. It is to be understood, however, that these examples are provided by way of illustration and nothing therein should be taken as a limitation upon the overall scope of the invention.

The following abbreviations are used in the Examples:
PPG—Preformed particle gel
HT—PPG-High temperature resistant preformed particle gels
DMA—N,N'-Dimethylacrylamide
NaSS—Sodium 4-vinylbenzenesulfonate
AMPS—2-Acrylamido-2-methylpropane sulfonic acid
PAA—Polyacrylic acid
PSS—Poly (sodium-4-vinylbenzenesulfonate)
PDMA—Poly (N,N'-dimethylacrylamide)
MBA—Methylenebisacrylamide
DVB—Divinylbenzene
TMPT—Trimethylolpropane triacrylate
APS—Ammonium persulfate
KPS—Potassium persulfate
AMHP—2,2'-Azobis [2-methyl-N-(2-hydroxyethyl) propionamide
AMPH—2,2'-Azobis (2-methylpropionamidine) dihydrochloride
TEMED—Tetramethylethylenediamine
SB—Sodium bisulfite
NaCl—Sodium chloride
KCl—Potassium chloride
Sea water—Brine with combination of monovalent ions like $Na^+$, $K^+$, $Cl^-$, $HCO_3^-$, etc and divalent ions like $Ca^{2+}$, $Mg^{2+}$, $SO_4^{2-}$, etc. with total dissolved solids content of 50,000 ppm.
TDS—Total dissolved solids Example 1

For viscosity measurements, PAA pristine polymer solution of 4 weight percent was prepared in deionized water. The solution was purged with argon gas and transferred into sealed glass tube. The aging was performed at 80° C. and 150° C. temperature for 1 month. Viscosity measurements were performed before and after aging to determine hydrolytic stability. Observations are tabulated in Table 1.

Example 2

PSS aqueous solution of 15 weight percent was prepared in deionized water. The solution was purged with argon gas and transferred into sealed glass tube. The aging was performed at 80° C., 120° C. and 150° C. temperature for 3 months. Viscosity measurements were performed before and after aging to determine hydrolytic stability. Observations are tabulated in Table 1.

Example 3

PSS aqueous solution of 15 weight percent was prepared in deionized water. The solution was purged with argon gas and transferred into sealed glass tube. The aging was performed at 80° C. and 150° C. temperature for 3 months. Viscosity measurements were performed before and after aging to determine hydrolytic stability. Observations are tabulated in Table 1.

TABLE 1

Polymer thermal stability data assessed through TGA and viscosity measurements of polymer aqueous solutions viscosity change on aging

| Polymer | Onset of TGA degradation (° C.) | Viscosity (in cP) measurements at 25° C. | | | | |
|---------|---------------------------------|------------------------------------------|--|--|--|--|
| | | Initial | Time of aging | Aging Temperature (° C.) | | |
| | | | | 80 | 120 | 150 |
| PAA | 215 | 13 | 1 month | 8.5 | NA | 4.1 |
| PDMA | 400 | 5.8 | 3 months | 6.5 | NA | 6.9 |
| PSS | 430 | 10.6 | 3 months | 10 | 9.2 | 8.5 |

Example 4

In a typical synthesis, NaSS (16 g, 25 mol % of total monomers) and DMA (23 g, 75 mol % of total monomers) were added to the deionized water (100 mL). Under vigorous stirring, DVB (0.03 g), AMHP (0.6 g) and TEMED (0.5 g) were added and the reaction mixture was heated at 50° C. for 20 hours. After polymerization, a bulk hydrogel was obtained, which was subsequently dried, pulverized and used for rheology measurements (see Table 2).

Example 5

In a typical synthesis, NaSS (27 g, 50 mol % of total monomers) and DMA (13 g, 50 mol % of total monomers)

were added to the deionized water (160 mL). Under vigorous stirring, DVB (0.03 g), AMHP (0.5 g) and TEMED (0.4 g) were added and the reaction mixture was heated at 50° C. for 48 hours. After polymerization, bulk hydrogel was obtained, which subsequently dried, pulverized and used for rheology measurements (see Table 2).

Example 6

In a typical synthesis, NaSS (19.6 g, 75 mol % of total monomers) and DMA (6.5 g, 25 mol % of total monomers) were added to the deionized water (140 mL). Under vigorous stirring, DVB (0.03 g), AMHP (0.52 g) and TEMED (0.4 g) were added and the reaction mixture was heated at 50° C. for 48 hours. After polymerization, bulk hydrogel was obtained, which subsequently dried, pulverized and used for rheology measurements (see Table 2).

Example 7

A representative HT-PPG preformed particle gel was prepared using free radical polymerization in solution. More particularly, NaSS (7 g, 5 mol % of total monomers) and DMA (61 g, 95 mol % of total monomers) were added to deionized water (230 mL). Under vigorous stirring DVB (0.07 g) AMHP (2.6 g) and TEMED (1 g) were added and the reaction mixture was heated at 50° C. for 15 hours. After polymerization, a bulk hydrogel was obtained, which was subsequently dried and pulverized. The HT-PPG was studied for swelling kinetics, thermal stability and rheology evaluations. The dried HT-PPG can be swollen back to hydrogel in different brine solutions at room temperature (23° C.) and 130° C. (see FIG. 1). The Thermostability test was carried out in high pressure glass tubes. PPGs were swollen in respective brine solutions at variable swelling ratio. For example, sample for swelling ratio of 15 was prepared by taking 1 g of dry HT-PPGs in a glass-tube containing 15 mL of 2% KCl brine solutions. Rheology measurements were performed before and after aging for 6 months in 2% KCl and sea water (see Table 2). No significant change in the elastic modulus (G') values observed. This explains the retention of the integrity of HT-PPGs with no loss in strength after aging for 6 months at 150° C. HT-PPGs thermal stability was checked by monitoring the volume changes in the swollen PPGs in variable brine solutions, on aging at 150° C. HT-PPGs are stable for minimum 12 months without showing any signs of degradation, change in shape and size or particles (see Table 3).

TABLE 2

Thermostability of Example 7 HT-PPG, exposed to 2% KCl and Sea water at swelling ratio of 15 evaluated based on gel strength measurements before and after aging at 150° C.

| | Sea Water | | 2% KCl | |
|---|---|---|---|---|
| | Gel strength (in Pa) at SR = 15 | | | |
| | G' | G" | G' | G" |
| Initial | 330 ± 50 | 75 ± 15 | 300 ± 50 | 65 ± 5 |
| After aging at 150° C. for 6 months | 325 ± 55 | 55 ± 5 | 315 ± 30 | 50 ± 10 |

TABLE 3

Thermostability of example 7 in 2% KCl and Sea water at SR = 15, aging at 150° C. Volume change of swollen HT-PPG on aging was monitored with reference to the initial volume

| Initial volume of swollen HT-PPG | 15 mL |
|---|---|
| After 1 month | No change in volume, shape and form of gels |
| After 2 months | No change in volume, shape and form of gels |
| After 3 months | No change in volume, shape and form of gels |
| After 4 months | No change in volume, shape and form of gels |
| After 6 months | No change in volume, shape and form of gels |
| After 9 months | No change in volume, shape and form of gels |
| After 12 months | No change in volume, shape and form of gels |

In this example, HT-PPG was swollen to different brine solutions and exposed to anaerobic conditions at 150° C. Observations demonstrate that these hydrogels maintain their integrity and strength, exemplifying that these materials are stable to extreme temperature of 150° C. and brine solutions after aging for a minimum of 12 months.

Example 8

A representative HT-PPG preformed particle gel was prepared using free radical polymerization in solution. More particularly, NaSS (15 g, 5 mol % of total monomers) and DMA (135 g, 95 mol % of total monomers) were added to the deionized water (360 mL). Under vigorous stirring, DVB (0.15 g), AMHP (3 g) and TEMED (2.2 g) were added and the reaction mixture was heated at 50° C. for 12 hours. After polymerization, bulk hydrogel was obtained, which was subsequently dried, pulverized and used for rheology measurements (see Table 4).

TABLE 4

Rheology comparison of HT-PPGs in Examples 4, 5, 6 and 8 in 2% KCl at swelling ratio of 15 at 23° C. (n = 3 to 5)

| | G' (Pa) | G" (Pa) |
|---|---|---|
| Example 8 | 890 ± 50 | 60 ± 2 |
| Example 4 | 475 ± 60 | 40 ± 6 |
| Example 5 | 105 ± 15 | 25 ± 2 |
| Example 6 | 85 ± 10 | 25 ± 2 |

Example 9

HT-PPG was prepared using free radical polymerization in solution. More particularly, NaSS (3 g) was added to the deionized water (13 mL). Under vigorous stirring, TMPT (0.02 g), APS (0.03 g) and TEMED (0.02 g) were added and the reaction mixture was heated at 25° C. for 24 hours. After polymerization, bulk hydrogel was obtained.

Example 10

Moreover, some other HT-PPG was prepared using free radical polymerization in solution. More particularly, NaSS (3 g) was added to the deionized water (13 mL). Under vigorous stirring, MBA (0.01 g), APS (0.03 g) and TEMED (0.01 g) were added and the reaction mixture was heated at 25° C. for 24 hours. After polymerization, bulk hydrogel was obtained.

Example 11

HT-PPG preformed particle gel was prepared using free radical polymerization in solution. More particularly, NaSS (3 g), AMPS (8.5 g) and DMA (24.5 g) were added to the deionized water (80 mL). Under vigorous stirring, DVB (0.03 g), AMHP (0.5 g) and TEMED (0.4 g) were added and the reaction mixture was heated at 55° C. for 18 hours. After polymerization, bulk hydrogel was obtained.

The invention claimed is:

1. A composition useful for controlling fluid flow, said composition comprising a plurality of swellable particles, said particles comprising one or more crosslinkers interspersed among crosslinkable polymer chains, and wherein said one or more crosslinkers comprises divinylbenzene, wherein:
   said one or more crosslinkers are capable of forming covalent bonds between the polymer chains; and
   upon swelling, said particles exhibit less than about 50 percent decrease in volume after being exposed to a temperature of at least about 130° C. for at least about 1 hour.

2. The composition of claim 1, wherein said one or more crosslinkable polymer chains comprises one or more nonionic monomers and/or one or more anionic monomers.

3. The composition of claim 2, wherein said one or more crosslinkable polymer chains comprise one or more nonionic monomers and one or more anionic monomers at a weight ratio of about 1:1 to about 100:1.

4. The composition of claim 2, wherein said nonionic monomer is N,N'-dimethylacrylamide.

5. The composition of claim 2, wherein said one or more anionic monomers is selected from the group consisting of sodium 4-vinylbenzenesulfonate, 2-acrylamido-2-methylpropane sulfonic acid, and combinations thereof.

6. The composition of claim 1, wherein the weight ratio of crosslinkable polymer chains to one or more crosslinkers is from about 100:1 to about 10,000:1.

7. The composition of claim 1, said particles further comprising an additive selected from the group consisting of tackifiers, plasticizers, crosslinking agents, polymers other than the crosslinkable polymer, aromatic compounds, deoxidants, adjustors of gelant, clays, nanoclay, initiators, stabilizers, celluloses, epoxy resins, silica, silicon oxide, aluminum oxide, carbon nanotubes, graphene, micro-fiber or nylon particles, ethylenediaminetetraacetic acid (EDTA), and mixtures thereof.

8. The composition of claim 1, wherein the average particle size of said swellable particles is from about 10 nm to about 10 mm.

9. The composition of claim 1, wherein said particles have an initial average particle size, and said particles are swellable to a size that is at least about 5 times that of the initial average particle size.

10. The composition of claim 1, wherein said one or more crosslinkable polymer chains comprises one or more nonionic monomers and one or more anionic monomers,
   wherein said one or more nonionic monomers comprises N,N-dimethylacrylamide and wherein said one or more nonionic monomers are present in said one or more crosslinkable polymer chains in an amount from 75 to 95 weight percent, based on the total monomer content of said one or more crosslinkable polymer chains; and
   wherein said one or more anionic monomers comprises 4-vinylbenzenesulfonate and wherein said 4-vinylbenzenesulfonate monomer is present in said one or more crosslinkable polymer chains in an amount of from about 1 to about 25 weight percent, based on the total monomer content of said one or more crosslinkable polymer chains.

11. A method of forming a composition useful for controlling fluid flow, said method comprising:
   (a) polymerizing a plurality of monomers in the presence of one or more crosslinkers so as to form crosslinkable polymer chains; and
   (b) drying and reducing the average particle size of the product resulting from (a) to yield a plurality of swellable particles comprising said one or more crosslinkers interspersed among said crosslinkable polymer chains, and wherein said one or more crosslinkers comprises divinylbenzene,
   wherein:
      said one or more crosslinkers are capable of forming covalent bonds with the polymer chains; and
      upon swelling, said particles exhibit less than about 50 percent decrease in volume after being exposed to a temperature of at least about 130° C. for at least about 1 hour.

12. The method of claim 11, wherein said polymerizing (a) occurs in the presence of one or more initiators selected from the group consisting of persulfate initiators, azo initiators, redox initiators, and combinations thereof.

13. The method of claim 12, wherein said one or more initiators are selected from the group consisting of ammonium persulfate, potassium persulfate, N,N,N',N'-tetramethylethylenediamine, sodium bisulfite, acyl peroxide, hydrogen peroxide, dialkyl peroxides, ester peroxide, ketone peroxide, 2'-azobis [2-methyl-N-(2-hydroxyethyl) propionamide, 2,2'-azobis (2-methylpropionamidine) dihydrochloride, and combinations thereof.

14. The method of claim 11, wherein said one or more crosslinkable polymer chains comprises one or more nonionic monomers and/or one or more anionic monomers.

15. The method of claim 14, wherein said crosslinkable polymer chains formed in (a) comprise one or more nonionic monomers and one or more anionic monomers at a weight ratio of about 1:1 to about 100:1.

16. The method of claim 14, wherein said nonionic monomer is N,N'-dimethylacrylamide.

17. The method of claim 14, wherein said one or more anionic monomers is selected from the group consisting of sodium 4-vinylbenzenesulfonate, 2-acrylamido-2-methylpropane sulfonic acid, and combinations thereof.

18. The method of claim 11, wherein the weight ratio of crosslinkable polymer chains to one or more crosslinkers is from about 10:1 to about 10,000:1.

19. The method of claim 11, said particles further comprising an additive selected from the group consisting of selected from the group consisting of tackifiers, plasticizers, crosslinking agents, polymers other than the crosslinkable polymer, aromatic compounds, deoxidants, adjustors of gelant, clays, nanoclay, initiators, stabilizers, celluloses, epoxy resins, silica, silicon oxide, aluminum oxide, carbon nanotubes, graphene, micro-fiber or nylon particles, ethylenediaminetetraacetic acid (EDTA), and mixtures thereof.

20. The method of claim 11, wherein the average particle size of said swellable particles is from about 10 nm to about 10 mm.

21. The method of claim 11, wherein said particles have an initial average particle size, and said particles are swellable to a size that is at least about 5 times that of the initial average particle size.

22. The method of claim 11, wherein said one or more crosslinkable polymer chains comprises one or more nonionic monomers and one or more anionic monomers,
wherein said one or more nonionic monomers comprises N,N-dimethylacrylamide and wherein said one or more nonionic monomers are present in said one or more crosslinkable polymer chains in an amount from 75 to 95 weight percent, based on the total monomer content of said one or more crosslinkable polymer chains; and
wherein said one or more anionic monomers comprises 4-vinylbenzenesulfonate and wherein said 4-vinylbenzenesulfonate monomer is present in said one or more crosslinkable polymer chains in an amount of from about 1 to about 25 weight percent, based on the total monomer content of said one or more crosslinkable polymer chains.

23. A method of altering or controlling a fluid present in an environment comprising introducing a composition into the environment so that said composition contacts the fluid, said composition comprising a plurality of swellable particles comprising one or more crosslinking agents interspersed among crosslinkable polymer chains and wherein said one or more crosslinkers comprises divinylbenzene, wherein:
said one or more crosslinkers are capable of forming covalent bonds with the polymer chains; and
upon swelling, said particles exhibit less than about 50 percent decrease in volume after being exposed to a temperature of at least about 130° C. for at least about 1 hour.

24. The method of claim 23, wherein upon contact with said fluid, said swellable particles begin to swell.

25. The method of claim 24, wherein said swelling commences within about 0.1 seconds to about 300 seconds of said contact.

26. The method of claim 24, wherein said fluid is selected from the group consisting of water, brine solvent, sea water, and other fluids that cause the gel particles to swell.

27. The method of claim 23, wherein said environment is selected from the group consisting of wells, pipelines, and fractures.

28. The method of claim 23, wherein said particles have an initial average particle size prior to said contact and wherein upon contact with said fluid, said particles swell to a second average particle size that is at least about 5 times that of the initial average particle size.

29. The method of claim 28, wherein said second average particle size is reached within about 60 minutes to about 240 hours of said contact.

30. The method of claim 23, wherein said one or more crosslinkable polymer chains comprises one or more nonionic monomers and/or one or more anionic monomers.

31. The method of claim 30, wherein said one or more crosslinkable polymer chains comprise one or more nonionic monomers and one or more anionic monomers at a weight ratio of about 1:1 to about 100:1.

32. The method of claim 30, wherein said nonionic monomer is N,N'-dimethylacrylamide.

33. The method of claim 30, wherein said one or more anionic monomers is selected from the group consisting of sodium 4-vinylbenzenesulfonate, 2-acrylamido-2-methylpropane sulfonic acid, and combinations thereof.

34. The method of claim 23, wherein the weight ratio of crosslinkable polymer chains to one or more crosslinkers is from about 100:1 to about 10,000:1.

35. The method of claim 23, said particles further comprising an additive selected from the group consisting of selected from the group consisting of tackifiers, plasticizers, crosslinking agents, polymers other than the crosslinkable polymer, aromatic compounds, deoxidants, adjustors of gelant, clays, nanoclay, initiators, stabilizers, celluloses, epoxy resins, silica, silicon oxide, aluminum oxide, carbon nanotubes, graphene, micro-fiber or nylon particles, ethylenediaminetetraacetic acid (EDTA), and mixtures thereof.

36. The method of claim 23, wherein said one or more crosslinkable polymer chains comprises one or more nonionic monomers and one or more anionic monomers,
wherein said one or more nonionic monomers comprises N,N-dimethylacrylamide and wherein said one or more nonionic monomers are present in said one or more crosslinkable polymer chains in an amount from 75 to 95 weight percent, based on the total monomer content of said one or more crosslinkable polymer chains; and
wherein said one or more anionic monomers comprises 4-vinylbenzenesulfonate and wherein said 4-vinylbenzenesulfonate monomer is present in said one or more crosslinkable polymer chains in an amount of from about 1 to about 25 weight percent, based on the total monomer content of said one or more crosslinkable polymer chains.

* * * * *